US006319459B1

(12) United States Patent
Melody et al.

(10) Patent No.: US 6,319,459 B1
(45) Date of Patent: Nov. 20, 2001

(54) REMOVAL OF ORGANIC ACID BASED BINDERS FROM POWDER METALLURGY COMPACTS

(75) Inventors: Brian John Melody, Greer; John Tony Kinard, Simpsonville; Keith Lee Moore, Greenville; David Alexander Wheeler, Williamston, all of SC (US)

(73) Assignee: Kemet Electronics Corporation, Geenville, SC (US)

( * ) Notice: Subject to any disclaimer, the term of this patent is extended or adjusted under 35 U.S.C. 154(b) by 0 days.

(21) Appl. No.: 09/419,893

(22) Filed: Oct. 18, 1999

(51) Int. Cl.$^7$ ........................................................ B22F 3/24
(52) U.S. Cl. ................. 419/26; 419/28; 419/36; 419/37; 148/513; 75/343
(58) Field of Search .................. 419/26, 36, 37; 423/335, 328.1; 428/480; 427/446; 75/228; 524/400

(56) References Cited

U.S. PATENT DOCUMENTS

| 4,197,118 | * | 4/1980 | Wiech, Jr. | 75/228 |
|---|---|---|---|---|
| 4,622,237 | * | 11/1986 | Lori | 427/446 |
| 4,661,315 | | 4/1987 | Weich, Jr. | 419/10 |
| 4,961,913 | | 10/1990 | Sullivan | 423/351 |
| 5,021,208 | | 6/1991 | Ludwig et al. | 264/344 |
| 5,080,846 | | 1/1992 | Kim et al. | 264/109 |
| 5,194,203 | | 3/1993 | Kankawa et al. | 264/125 |
| 5,236,680 | * | 8/1993 | Nakazawa et al. | 423/328.1 |
| 5,236,683 | * | 8/1993 | Nakazawa et al. | 423/335 |
| 5,242,757 | * | 9/1993 | Buisine et al. | 428/480 |
| 5,308,402 | | 5/1994 | Bixeman | 134/2 |
| 5,342,563 | | 8/1994 | Quinn et al. | 264/681 |
| 5,380,179 | | 1/1995 | Nishimura et al. | 419/36 |
| 5,393,486 | | 2/1995 | Eckert et al. | 419/66 |
| 5,470,525 | | 11/1995 | Tripp et al. | 419/36 |
| 5,574,959 | | 11/1996 | Tsujioka et al. | 419/2 |
| 5,585,428 | * | 12/1996 | Quinn et al. | 524/400 |
| 5,656,218 | | 8/1997 | Lin et al. | 501/89 |
| 5,665,289 | | 9/1997 | Chung et al. | 264/628 |

FOREIGN PATENT DOCUMENTS

WO 98 30348    7/1998   (WO) .

OTHER PUBLICATIONS

PCT/US00/26297/International Search Report, dated Mar. 2001.

* cited by examiner

Primary Examiner—Gregory Mills
Assistant Examiner—Rudy Zervigon
(74) Attorney, Agent, or Firm—Banner & Witcoff, Ltd.

(57) ABSTRACT

Organic acid-based binders are efficiently removed from powder metallurgy compacts, such as tantalum capacitor anode bodies, by immersion in a heated aqueous alkanolamine solution followed by rinsing in warm water. This method results in lower residual carbon and oxygen levels than are found with thermal binder removal methods.

16 Claims, No Drawings

REMOVAL OF ORGANIC ACID BASED BINDERS FROM POWDER METALLURGY COMPACTS

FIELD OF THE INVENTION

The invention relates to the removal of organic acid based binders from powder metallurgy compacts.

BACKGROUND OF THE INVENTION

Sintered powder metallurgy compacts having a density significantly below the theoretical density, so as to give rise to porosity throughout the bodies of the compacts, find use in many fields. Powder metallurgy compacts are used as filters for liquids and gases, as catalytic and heat exchange surfaces in chemical reaction chambers, and in the electrical industry as electrodes in flash tubes (strobe lights), as electrodes in wet-cell rectifiers and at least one type of lighting arrestor. Perhaps the most demanding use for porous powder metallurgy compacts is as capacitor anode bodies in the fabrication of electrolytic capacitors.

Powder metallurgy compacts fabricated from valve metals, particularly tantalum are employed as the anodes in electrolytic capacitors and are manufactured on a huge scale, amounting to several billion powder metallurgy anode bodies world-wide annually. The mass production of capacitor anode bodies on such a scale requires the use of automatic anode body compacting presses which must be capable of running many tens of thousands of anode bodies without attention in order to carry-out the anode compact fabrication in a cost-effective fashion.

Experience has demonstrated that compacting press die life may be significantly extended by the incorporation of a low percentage of a binder/lubricant in the valve metal powder used in the fabrication of porous capacitor anode bodies. Typical materials used as binders/lubricants in the fabrication of powder metallurgy capacitor anode bodies include higher molecular weight carboxylic acids, such as stearic acid, amide waxes, such as ethylene diamine bis di-stearamide (sold by Lonza Chemical Company under the tradename "Acrawax"), and polyethylene glycol 8000 (sold by The Union Carbide Corporation under the tradename "Carbowax 8000"). These materials are employed at a concentration of from about 0.1 wt. % to about 5 wt. %, based upon the weight of the metal powder. For tantalum powders, the weight of binder/lubricant is typically 1 wt. % to 2 wt. %.

The binder/lubricant may be mixed with the metal powder either by dry-blending the solids together or by dissolving the binder/lubricant in a suitable solvent, then mixing the binder/lubricant solution with the metal powder and evaporating the solvent (so-called "wet blending"). Following wet-blending, the binder-coated metal powder is typically screened to give a powder composed of agglomerates of the metal powder/binder combination having the flow properties required for mass-production anode fabrication on automatic anode pressing equipment.

As the demand for capacitor miniaturization, ever-increasing capacitance per package size, and reduced valve metal cost per device continues, capacitor powder producers have introduced tantalum powders having surface areas of 0.5 square meter per gram and greater. The use of these finer capacitor powders has led to two major problems in the fabrication of capacitor anode bodies on mass-production equipment. The first of these problems is the generation of a relatively large amount of fine dust during processing through anode compacting presses. This dust, while of a relatively low toxicity, is a fire and explosion hazard, necessitating the use of high air flow ventilation systems in anode pressing areas. The airborne dust from high surface area capacitor powders also finds its way into press bearings, gears, etc., resulting in greatly accelerated wear of these surfaces. It has been found that the so called "wet blending" of the binder/lubricant greatly reduces dust generation and machine wear by anchoring the fine dust in the capacitor powder/binder agglomerates.

The second major problem associated with the high surface area capacitor powders is the removal of the binder/lubricant from the capacitor anode compacts prior to the sintering operation. The binder has traditionally been removed by heating the anode compacts to temperatures ranging from 300° C. to 600° C. under vacuum. With the use of increasingly finer capacitor powders, it has become increasingly difficult to remove the binder before it reacts with the valve metal capacitor powder. The carbon and oxygen remaining after binder removal process tend to react with the valve metal during the sintering operation. Residual carbon and oxygen remaining after the sintering operation tend to cause the anodic oxide film grown on the anode surfaces to be flawed. Flawed anodic oxide is more electrically leaky and less stable than more flaw-free oxide.

One approach to the reduction of residual carbon, etc., in sintered anodes which have been fabricated from binder-containing capacitor powder is the use of polypropylene carbonate as the binder. This material, sold under the tradename of "Q-Pac" by PAC-Polymers, Inc., may be wet-blended with the capacitor powder using an aggressive solvent (e.g., acetone, hot toluene, chlorinated organics, etc.). Polypropylene carbonate is thermally decomposed at 250° C. to yield propylene carbonate, propylene oxide, and carbon dioxide, all of which may be removed under vacuum. As capacitor powder surface areas exceed about 0.5 square meter per gram, especially with materials more active than tantalum (for example, niobium), the removal of the last few hundred ppm of carbon from anode body compacts containing polypropylene carbonate becomes increasingly difficult.

Another approach to the problem of removing binders from anode compacts prior to sintering is described in U.S. Pat. No. 5,470,525 (Tripp, et al.) The inventors employ a water or water and detergent wash in combination with a water-soluble binder (or a binder that can be rendered water-soluble through the use of a detergent) to remove the binder from the anode compacts prior to the sintering step. This method works quite well for anode bodies containing water-soluble binders, such as polyethylene glycol 8000 (Carbowax 8000).

It is pointed-out, however, in PCT International Publication Number WO 98/30348, Title: "Binder Removal", Bishop et al., that the method of Tripp, et. al. (U.S. Pat. No. 5,470,525) requires a number of hours for both the detergent wash stage and the water rinse stage when water-insoluble binders, such as stearic acid, are employed. Bishop, et. al. employ dilute (i.e., 0.5%) 80° C. solutions of alkali metal hydroxide, such as sodium hydroxide, or ammonium hydroxide, to convert the fatty acid binder, such as stearic acid, to a water soluble salt which is then readily removed via water rinsing.

Unfortunately, with very high surface area capacitor powders, it is difficult to establish circulation of the dilute hydroxide solutions through the pores of the capacitor anode bodies. This lengthens the time required to leach the fatty acid binder from the anode bodies due to the increased time required for complete reaction to form water soluble salt species. The problem is further aggravated by anode size; fatty acid binders are more difficult to remove from larger anodes than from smaller anodes due to the increasing pore path length into the internal portions of the larger anodes. The problem is yet further aggravated by large anode load size and still further aggravated by low rates of leach solution and rinse water flow.

In addition, concentrated solutions of ammonium hydroxide give off noxious fumes at 80° C. and solutions of alkali metal hydroxides which are significantly more concentrated than 0.5% tend to attack even tantalum capacitor powders. 5 wt. % potassium hydroxide gives a visible reaction with tantalum powder at 80° C., resulting in the production of a thick potassium tantalum oxide coating having a purple color and containing over 10% oxygen.

There is a need, therefore, for an efficient method of leaching the higher molecular weight or "fatty" carboxylic acids binders or other organic binders from pressed anode bodies without the need to circulate large quantities of detergent or dilute hydroxide solutions through the anodes a water rinse step.

Ideally, the leach solution should contain sufficient alkaline substance such that the liquid which initially wets the anode bodies during binder leaching converts the contained fatty acid to a water-soluble salt. The leach solution should be maintained at a sufficiently high temperature, for example, 80° C., such that the conversion of the carboxylic acid binder to a soluble salt takes place rapidly.

Amines have been tried as possible binder removers, but are generally not suitable. For example, the lower molecular weight amines, such as trimethyl amine, have excessively high vapor pressure at the elevated temperature range of this invention (e.g., 80° C.). The higher molecular weight amines, such as tripropyl amine and tributyl amine, have low water solubility, are poorly ionized in aqueous solution, or form only sparingly soluble salts with higher molecular weight organic acids, such as such a stearic acid. Still other amines, such as ethylene diamine, diethylamine triamine, or guanidine, have high water solubility, are highly ionized in water solutions, and form soluble carboxylic acid salts but are carcinogens or are allergens for a large portion of the population.

SUMMARY OF THE INVENTION

The invention is directed to the use of alkanolamines for the removal of organic acid-based binders such as carboxylic acid-based binders. In particular, the invention is directed to a method of removing acid-based binders from a powder metallurgy compact comprising immersing said compact in an aqueous solution of alkanolamine at a temperature of between about 50° C. and about 100° C., for a time sufficient to remove the acid-based binder and then rinsing the compact.

Preferably the alkanolamine is formed by the reaction between dimethyl amine and one or more equivalents of ethylene oxide, more preferably, the alkanolamine is dimethyl ethanolamine or dimethyl ethoxy ethanolamine.

The present invention is particularly used for the removal of carboxylic acid-based binders such as stearic acid.

DETAILED DESCRIPTION OF THE INVENTION

It was discovered that alkanolamines are useful to remove organic acid-based binders from powder metallurgy compacts. The acid-based binders are typically higher molecular weight carboxylic acids, such as stearic acid, hexadecanoic acid, octadecanoic acid, and nonadecanoic acid. The binders are preferably solid binders.

Alkanolamines tend to be miscible with water in all proportions, from room temperature to boiling point. Alkanolamines do not attack valve metals, especially tantalum, below the boiling point of water, and are sufficiently ionized in water solution to react rapidly with the carboxylic acid binders at 80° C.

It was further discovered that alkanolamines formed by the reaction between dimethyl amine and one or more equivalents of ethylene oxide to give dimethyl ethanolamine, dimethyl ethoxy ethanolamine, etc., give extraordinarily soluble salts with high molecular weight carboxylic acids. Other alkanolamines include dimethyl isopropanolamine and triethanolamine.

An aqueous solution of alkanolamines is used, generally containing about 1 to about 99 wt % alkanolamine, preferably about 2 to 30 wt %, more preferably about 5 to about 15 wt % alkanolamine and most preferably about 10 wt % alkanolamine. Small amounts of other water soluble ingredients may be present such as wetting agents, so long as such ingredients do not affect the desired binder removal result.

Generally, compacts, and in particular anodes, are pressed from high surface area capacitor powders using an acid binder. The anodes are then immersed in a aqueous solution of alkanolamine at a temperature of between about 50° C. and about 100° C., preferably about 70° C. to about 90° C., most preferably about 80° C. The time of immersion is sufficient to remove the organic acid-based binder and is typically 10 minutes to 5 hours, preferably about 60 minutes.

The acid is converted into the soluble amine salt, which is then rinsed from the anodes in flowing de-ionized water or in a sufficiently large container of uncirculated de-ionized water. The water should be warm, preferably at a temperature between about between about 50° C. and about 100° C., preferably about 70° C. to about 90° C.

The anodes are then dried, such as in a circulating air oven at about 50° C. to about 100° C., preferably for about 10 to about 120 minutes. The anodes may then be sintered normally. The anodes may be dried at shorter times and higher temperatures under inert gas or vacuum.

In accordance with a preferred embodiment of the invention, anodes pressed from high surface area capacitor powders using a stearic acid binder are placed in tantalum crucibles such as are commonly used to sinter tantalum anodes, equipped with drain holes in the bottoms (to allow the leach solution and rinse water to drain from the anodes.) The crucibles are immersed in a 10% aqueous solution of dimethyl ethanolamine at 80° C. without circulation. The carboxylic acid is converted into the soluble amine salt, which is then rinsed from the anodes in a flowing, 80° C. de-ionized water or in a sufficiently large container of uncirculated de-ionized water. The anodes are then be dried in a circulating air oven (an inert cover gas or vacuum may be advisable for anodes pressed from the finest capacitor powders) at 50° C. to 100° C. The anodes may then be sintered normally.

EXAMPLES

Example 1

Anode: 0.242 gram, Cabot C726 Tantalum Powder
0.185"×0.128"×0.125"
All anodes were sintered at 1400° C. for 15 minutes.

|  | Group A | Group B | Group C |
| --- | --- | --- | --- |
| Binder: | 2% Propylene Carbonate | 1% Stearic Acid | 1% Stearic Acid |
| Binder Removal | 350° C./1 1/2 Hours Vacuum | 400° C./1¼ Vacuum | Invention** |
| Post Binder Removal: Carbon | not measured | 814 ppm | 287 ppm* |
| Post Binder Removal: Oxygen | not measured | 5,521 ppm | 53,150 ppm* |
| Post Sintering: Carbon | 154 ppm | not measured | 104 ppm* |
| Post Sintering: Oxygen | 8,635 ppm | not measured | 6,955 ppm* |

*still damp, some amine in anodes
**Anodes immersed in static 10% aqueous dimethyl ethanolamine at 80° C. for 60 minutes. Anodes then immersed in static de-ionized water at 80° C. for 90 minutes (1 liter of water for each 120 gram of anodes). Anodes then rinsed with 300 milliliters of de-ionized water (room temperature) per 100 grams of anodes

Example 2

The capacitance, CV/gram, direct current leakage, and normalized direct current leakage (nanoamperes/CV) are given for the 3 groups of anodes in Example 1 after anodizing the anodes to 30 volts in 0.05% phosphoric acid at 80° C.

|  | Capacitance ($\mu$F) | CV/gram ($\mu$F-volt/gram) | DCL (microamperes) | Nanoamperes/CV (nanoamperes/$\mu$F-volt) |
| --- | --- | --- | --- | --- |
| Group A | 473.47 | 59,491 | 18.2293 | 1.2864 |
| Group B | 475.33 | 59,715 | 29.2929 | 2.0543 |
| Group C | 450.41 | 57,604 | 10.1183 | 0.7479 |

It is readily apparent from the post-sintering data in Example 1 that the binder removal method of the invention makes possible a lower residual carbon content and reduced oxygen incorporation than prior art thermal binder removal methods. It is readily apparent from the electrical leakage current data given in Example 2 that the lower carbon and oxygen contamination resulting from application of the binder removal method of the invention results in the production of a more electrically insulating dielectric film during the anodizing process.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method of removing organic acid-based binders from a powder metallurgy compact comprising immersing said compact in an aqueous solution of alkanolamine at a temperature of between about 50° C. and about 100° C., for a time sufficient to react with the organic acid-based binder to form a water-soluble salt, and then rinsing the compact.

2. The method of claim 1 further comprising rinsing the compact in de-ionized water.

3. The method of claim 1 wherein the temperature is between about 70° C. and about 90° C.

4. The method of claim 1 wherein the alkanolamine is formed by the reaction between dimethyl amine and one or more equivalents of ethylene oxide.

5. The method of claim 4 wherein the alkanolamine is dimethyl ethanolamine or dimethyl ethoxy ethanolamine.

6. The method of claim 1 wherein the aqueous solution of alkanolamines contains about 1 to about 99 wt % alkanolamine.

7. The method of claim 6 wherein the aqueous solution of alkanolamines contains about 2 to about 30 wt % alkanolamine.

8. The method of claim 7 wherein the aqueous solution of alkanolamines contains about 5 to about 15 wt % alkanolamine.

9. The method of claim 1 wherein the organic acid-based binder is a carboxylic acid-based binder.

10. The method of claim 9 wherein the organic acid-based binder is stearic acid, hexadecanoic acid, octadecanoic acid, or nonadecanoic acid.

11. The method of claim 10 wherein the organic acid-based binder is stearic acid.

12. The method of claim 1 wherein the compact is rinsed in flowing de-ionized water or in uncirculated de-ionized water.

13. The method of claim 1 wherein the compact is rinsed in water having a temperature of between about 50° C. and about 100° C.

14. The method of claim 13 wherein the water has a temperature of between about 70° C. and about 90° C.

15. The method of claim 1 further comprising, after rinsing, drying the compact at a temperature of between about 50° C. and about 100° C.

16. The method of claim 1 wherein the compact is an anode.

* * * * *